US012046212B2

(12) United States Patent
Jia

(10) Patent No.: US 12,046,212 B2
(45) Date of Patent: Jul. 23, 2024

(54) GOA CIRCUIT AND DISPLAY PANEL

(71) Applicant: TCL CHINA STAR OPTOELECTRONICS TECHNOLOGY CO., LTD., Guangdong (CN)

(72) Inventor: Shasha Jia, Shenzhen (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/779,150

(22) PCT Filed: May 13, 2022

(86) PCT No.: PCT/CN2022/092709

§ 371 (c)(1),
(2) Date: May 24, 2022

(87) PCT Pub. No.: WO2023/206624

PCT Pub. Date: Nov. 2, 2023

(65) Prior Publication Data

US 2024/0169950 A1 May 23, 2024

(30) Foreign Application Priority Data

Apr. 27, 2022 (CN) ........................ 202210456467.1

(51) Int. Cl.
*G09G 3/20* (2006.01)
*G09G 3/36* (2006.01)

(52) U.S. Cl.
CPC ... *G09G 3/3677* (2013.01); *G09G 2300/0408* (2013.01); *G09G 2310/08* (2013.01)

(58) Field of Classification Search
CPC ....... G09G 2310/08; G09G 2300/0408; G09G 3/3677
See application file for complete search history.

(56) References Cited

U.S. PATENT DOCUMENTS

| | | | | |
|---|---|---|---|---|
| 2012/0056858 A1 | 3/2012 | Ahn et al. | | |
| 2014/0159997 A1* | 6/2014 | Chen | .................... | G09G 3/3611 345/87 |
| 2015/0243367 A1* | 8/2015 | Gu | ......................... | G11C 19/28 377/64 |

FOREIGN PATENT DOCUMENTS

| | | |
|---|---|---|
| CN | 106057157 A | 10/2016 |
| CN | 106409262 A | 2/2017 |
| CN | 106448592 A | 2/2017 |
| CN | 106571123 A | 4/2017 |
| CN | 107331360 A | 11/2017 |

(Continued)

*Primary Examiner* — Abbas I Abdulselam
(74) *Attorney, Agent, or Firm* — PV IP PC; Zhigang Ma; Wei Te Chung

(57) ABSTRACT

A GOA circuit and a display panel according to an embodiment of the present disclosure include multi-stage cascaded GOA units. Each GOA unit includes a pull-up control module, an output module, a stage transfer module, a pull-down module, and a pull-down maintenance module. The GOA circuit has a simple structure and can reduce a space occupied by a circuit layout while ensuring the circuit function. Therefore, an aperture ratio of the display panel is increased, and requirements for a narrow frame and a high resolution for the display panel are met.

20 Claims, 4 Drawing Sheets

(56) References Cited

FOREIGN PATENT DOCUMENTS

| | | | |
|---|---|---|---|
| CN | 109410820 | A | 3/2019 |
| CN | 109509459 | A | 3/2019 |
| CN | 110007628 | A | 7/2019 |
| CN | 111477156 | A | 7/2020 |
| CN | 113362752 | A | 9/2021 |

* cited by examiner

GOA CIRCUIT AND DISPLAY PANEL

TECHNICAL FIELD

The present disclosure relates to a display technology field, and in particular, to a GOA circuit and a display panel.

BACKGROUND

The current LCD (Liquid Crystal Display) splicing screen needs to realize the bonding of printed circuit board and side printing on both of the gate drive side and the source drive side. During a splicing process, the single board module still needs to be double-sided spliced, so that the splicing risk and the single board process are difficult, and the drive and module costs are relatively high.

In the GOA (Gate Driver on Array) technology, the gate drive circuit is integrated on an array substrate of a display panel, so that the gate drive integrated circuit portion can be omitted.

Therefore, it is difficult for the current panel manufacturers about how to provide a GOA circuit to meet requirements for a narrow frame and a high resolution for the display panel. By integrating this GOA circuit in a display area, the liquid crystal splicing screen only needs one-sided side printing and splicing, and the space occupied by the circuit layout is reduced while the circuit function is guaranteed. Therefore, an aperture ratio of the display panel is increased.

Technical Problems

An object of an embodiment of the present disclosure is to provide a GOA circuit and a display panel. The GOA circuit has a simple structure and can reduce a space occupied by a circuit layout while ensuring the circuit function. Therefore, an aperture ratio of the display panel is increased, and requirements for a narrow frame and a high resolution for the display panel are met.

Technical Solutions

According to one aspect, an embodiment of the present disclosure provides a GOA circuit comprising multi-stage cascaded GOA units, wherein each of the GOA units comprises a pull-up control module, an output module, a stage transfer module, a pull-down module and a pull-down maintenance module; the pull-up control module is input with a previous-stage stage transfer signal and a reference high level signal, and is electrically connected to a first node, and the pull-up control module is configured to raise a potential of the first node to a potential of the reference high level signal under the control of the previous-stage stage transfer signal; the output module is input with a first clock signal, and electrically connected to the first node and a current-stage scanning signal, and the output module is configured to output the current-stage scanning signal under the control of the potential of the first node; the stage transfer module is input with the first clock signal, and electrically connected to the first node and a current-stage stage transfer signal, and the stage transfer module is configured to output the current-stage stage transfer signal under the control of the potential of the first node; the pull-down module is input with a next stage scanning signal, the current-stage stage transfer signal, the current-stage scanning signal, a first reference low level signal, and a second reference low level signal, and is electrically connected to the first node and a second node, and the pull-down module is configured to pull down the potential of the first node, a potential of the second node, and a potential of the current-stage stage transfer signal to a potential of the first reference low level signal, and pull down a potential of the current-stage scanning signal to a potential of the second reference low level signal, under the control of the next stage scanning signal; and the pull-down maintenance module is input with a reset signal, a second clock signal, the current-stage scanning signal, the first reference low level signal, and the second reference low level signal, and is electrically connected to the first node and the second node, and the pull-down maintenance module is configured to maintain the potentials of the first node and the second node at the potential of the first reference low level signal, and maintain the potential of the current-stage scanning signal at the potential of the second reference low level signal under the control of the reset signal and the second clock signal.

Alternatively, in some embodiments of the present disclosure, Each of the GOA units further comprises a bootstrap capacitor, two terminals of the bootstrap capacitor are electrically connected to the first node and the current-stage scanning signal, respectively, and the bootstrap capacitor is configured to raise the potential of the first node again to ensure normal output of the current-stage scanning signal.

Alternatively, in some embodiments of the present disclosure, the pull-up control module comprises a first transistor, a gate of the first transistor is input with the previous-stage stage transfer signal, a first electrode of the first transistor is input with the reference high level signal, and a second electrode of the first transistor is electrically connected to the first node.

Alternatively, in some embodiments of the present disclosure, the output module comprises a second transistor, a gate of the second transistor is electrically connected to the first node, a first electrode of the second transistor is input with the first clock signal, and a second electrode of the second transistor is electrically connected to the current-stage scanning signal.

Alternatively, in some embodiments of the present disclosure, the stage transfer module comprises a third transistor, a gate of the third transistor is electrically connected to the first node, a first electrode of the third transistor is input with the first clock signal, and a second electrode of the third transistor is electrically connected to the current-stage stage transfer signal.

Alternatively, in some embodiments of the present disclosure, the pull-down module comprises a fourth transistor, a fifth transistor, a sixth transistor, and a seventh transistor, wherein a gate of the fourth transistor is input with the current-stage stage transfer signal, a first electrode of the fourth transistor is electrically connected to the current-stage scanning signal, and a second electrode of the fourth transistor is electrically connected to the second node; a gate of the fifth transistor is input with the next stage scanning signal, a first electrode of the fifth transistor is electrically connected to the current-stage scanning signal, and a second electrode of the fifth transistor is input with the second reference low level signal; a gate of the sixth transistor is input with the next stage scanning signal, a first electrode of the sixth transistor is electrically connected to the first node, and a second electrode of the sixth transistor is electrically connected to the second node; and a gate of the seventh transistor is input with the next stage scanning signal, a first electrode of the seventh transistor is electrically connected to the second node, and a second electrode of the seventh transistor is input with the first reference low level signal.

Alternatively, in some embodiments of the present disclosure, the pull-down maintenance module comprises an eighth transistor, a ninth transistor, a tenth transistor, an eleventh transistor, a twelfth transistor, a thirteenth transistor, a fourteenth transistor, and a fifteenth transistor, wherein a gate of the eighth transistor is electrically connected to a third node, a first electrode of the eighth transistor is electrically connected to the first node, and a second electrode of the eighth transistor is electrically connected to the second node; a gate of the ninth transistor is electrically connected to the third node, a first electrode of the ninth transistor is electrically connected to the second node, and a second electrode of the ninth transistor is input with the first reference low level signal; a gate of the tenth transistor is electrically connected to the third node, a first electrode of the tenth transistor is electrically connected to the current-stage scanning signal, and a second electrode of the tenth transistor is input with the second reference low level signal; both a gate of the eleventh transistor and a first electrode of the eleventh transistor are input with the second clock signal, and the second electrode of the eleventh transistor is electrically connected to a fourth node; a gate of the twelfth transistor is electrically connected to the fourth node, a first electrode of the twelfth transistor is input with the second clock signal, and a second electrode of the twelfth transistor is electrically connected to the third node; a gate of the thirteenth transistor is electrically connected to a fifth node, a first electrode of the thirteenth transistor is electrically connected to the fourth node, and a second electrode of the thirteenth transistor is input with the first reference low level signal; a gate of the fourteenth transistor is electrically connected to the fifth node, a first electrode of the fourteenth transistor is electrically connected to the third node, and a second electrode of the fourteenth transistor is input with the first reference low level signal; and a gate of the fifteenth transistor is input with the reset signal, a first electrode of the fifteenth transistor is electrically connected to the fifth node, and a second electrode of the fifteenth transistor is input with the first reference low level signal.

Alternatively, in some embodiments of the present disclosure, a potential of the first clock signal is opposite to a potential of the second clock signal.

Alternatively, in some embodiments of the present disclosure, when in operation, a start signal is input into the pull-up control module of a first GOA unit and the pull-down module of a last GOA unit.

Alternatively, in some embodiments of the present disclosure, the first transistor, the second transistor, the third transistor, the fourth transistor, the fifth transistor, the sixth transistor, the seventh transistor, the eighth transistor, the ninth transistor, the tenth transistor, the eleventh transistor, the twelfth transistor, the thirteenth transistor, the fourteenth transistor, and the fifteenth transistor are transistors of the same type.

In another aspect, the present disclosure provides a display panel comprising a display area and a GOA circuit integrated on the display area, wherein the GOA circuit comprises multi-stage cascaded GOA units, and wherein each of the GOA units comprises a pull-up control module, an output module, a stage transfer module, a pull-down module and a pull-down maintenance module; the pull-up control module is input with a previous-stage stage transfer signal and a reference high level signal, and is electrically connected to a first node, and the pull-up control module is configured to raise a potential of the first node to a potential of the reference high level signal under the control of the previous-stage stage transfer signal; the output module is input with a first clock signal, and electrically connected to the first node and a current-stage scanning signal, and the output module is configured to output the current-stage scanning signal under the control of the potential of the first node; the stage transfer module is input with the first clock signal, and electrically connected to the first node and a current-stage stage transfer signal, and the stage transfer module is configured to output the current-stage stage transfer signal under the control of the potential of the first node; the pull-down module is input with a next stage scanning signal, the current-stage stage transfer signal, the current-stage scanning signal, a first reference low level signal, and a second reference low level signal, and is electrically connected to the first node and a second node, and the pull-down module is configured to pull down the potential of the first node, a potential of the second node, and a potential of the current-stage stage transfer signal to a potential of the first reference low level signal, and pull down a potential of the current-stage scanning signal to a potential of the second reference low level signal, under the control of the next stage scanning signal; and the pull-down maintenance module is input with a reset signal, a second clock signal, the current-stage scanning signal, the first reference low level signal, and the second reference low level signal, and is electrically connected to the first node and the second node, and the pull-down maintenance module is configured to maintain the potentials of the first node and the second node at the potential of the first reference low level signal, and maintain the potential of the current-stage scanning signal at the potential of the second reference low level signal under the control of the reset signal and the second clock signal.

Alternatively, in some embodiments of the present disclosure, Each of the GOA units further comprises a bootstrap capacitor, two terminals of the bootstrap capacitor are electrically connected to the first node and the current-stage scanning signal, respectively, and the bootstrap capacitor is configured to raise the potential of the first node again to ensure normal output of the current-stage scanning signal.

Alternatively, in some embodiments of the present disclosure, the pull-up control module comprises a first transistor, a gate of the first transistor is input with the previous-stage stage transfer signal, a first electrode of the first transistor is input with the reference high level signal, and a second electrode of the first transistor is electrically connected to the first node.

Alternatively, in some embodiments of the present disclosure, the output module comprises a second transistor, a gate of the second transistor is electrically connected to the first node, a first electrode of the second transistor is input with the first clock signal, and a second electrode of the second transistor is electrically connected to the current-stage scanning signal.

Alternatively, in some embodiments of the present disclosure, the stage transfer module comprises a third transistor, a gate of the third transistor is electrically connected to the first node, a first electrode of the third transistor is input with the first clock signal, and a second electrode of the third transistor is electrically connected to the current-stage stage transfer signal.

Alternatively, in some embodiments of the present disclosure, the pull-down module comprises a fourth transistor, a fifth transistor, a sixth transistor, and a seventh transistor, wherein a gate of the fourth transistor is input with the current-stage stage transfer signal, a first electrode of the fourth transistor is electrically connected to the current-stage scanning signal, and a second electrode of the fourth transistor is electrically connected to the second node; a gate of the fifth transistor is input with the next stage scanning signal, a first electrode of the fifth transistor is electrically connected to the current-stage scanning signal, and a second electrode of the fifth transistor is input with the second reference low level signal; a gate of the sixth transistor is input with the next stage scanning signal, a first electrode of the sixth transistor is electrically connected to the first node, and a second electrode of the sixth transistor is electrically connected to the second node; and a gate of the seventh transistor is input with the next stage scanning signal, a first electrode of the seventh transistor is electrically connected to the second node, and a second electrode of the seventh transistor is input with the first reference low level signal.

Alternatively, in some embodiments of the present disclosure, the pull-down maintenance module comprises an eighth transistor, a ninth transistor, a tenth transistor, an eleventh transistor, a twelfth transistor, a thirteenth transistor, a fourteenth transistor, and a fifteenth transistor, wherein a gate of the eighth transistor is electrically connected to a third node, a first electrode of the eighth transistor is electrically connected to the first node, and a second electrode of the eighth transistor is electrically connected to the second node; a gate of the ninth transistor is electrically connected to the third node, a first electrode of the ninth transistor is electrically connected to the second node, and a second electrode of the ninth transistor is input with the first reference low level signal; a gate of the tenth transistor is electrically connected to the third node, a first electrode of the tenth transistor is electrically connected to the current-stage scanning signal, and a second electrode of the tenth transistor is input with the second reference low level signal; both a gate of the eleventh transistor and a first electrode of the eleventh transistor are input with the second clock signal, and the second electrode of the eleventh transistor is electrically connected to a fourth node; a gate of the twelfth transistor is electrically connected to the fourth node, a first electrode of the twelfth transistor is input with the second clock signal, and a second electrode of the twelfth transistor is electrically connected to the third node; a gate of the thirteenth transistor is electrically connected to a fifth node, a first electrode of the thirteenth transistor is electrically connected to the fourth node, and a second electrode of the thirteenth transistor is input with the first reference low level signal; a gate of the fourteenth transistor is electrically connected to the fifth node, a first electrode of the fourteenth transistor is electrically connected to the third node, and a second electrode of the fourteenth transistor is input with the first reference low level signal; and a gate of the fifteenth transistor is input with the reset signal, a first electrode of the fifteenth transistor is electrically connected to the fifth node, and a second electrode of the fifteenth transistor is input with the first reference low level signal.

Alternatively, in some embodiments of the present disclosure, a potential of the first clock signal is opposite to a potential of the second clock signal.

Alternatively, in some embodiments of the present disclosure, when in operation, a start signal is input into the pull-up control module of a first GOA unit and the pull-down module of a last GOA unit.

Alternatively, in some embodiments of the present disclosure, the first transistor, the second transistor, the third transistor, the fourth transistor, the fifth transistor, the sixth transistor, the seventh transistor, the eighth transistor, the ninth transistor, the tenth transistor, the eleventh transistor, the twelfth transistor, the thirteenth transistor, the fourteenth transistor, and the fifteenth transistor are transistors of the same type.

BENEFICIAL EFFECTS

In the GOA circuit and display panel provided in the embodiments of the present disclosure, the embodiments of the present disclosure provide a GOA circuit including a multi-stage cascaded GOA unit, each level GOA unit including a pull-up control module, an output module, a stage transfer module, a pull-down module, and a pull-down maintenance module. The GOA circuit has a simple structure and can reduce the space of the circuit layout while ensuring the circuit function, increase the aperture ratio of the display panel, and meet the requirements of the narrow frame and high resolution of the display panel.

BRIEF DESCRIPTION OF THE DRAWINGS

In order to more clearly describe technical solutions in embodiments of the present disclosure, the accompanying drawings required in the description of the embodiments will be briefly described below. It is apparent that the accompanying drawings in the following description are merely some embodiments of the present disclosure, and other drawings may be obtained by those skilled in the art without creative efforts from these figures.

EMBODIMENT OF THE PRESENT DISCLOSURE

Figure 1:
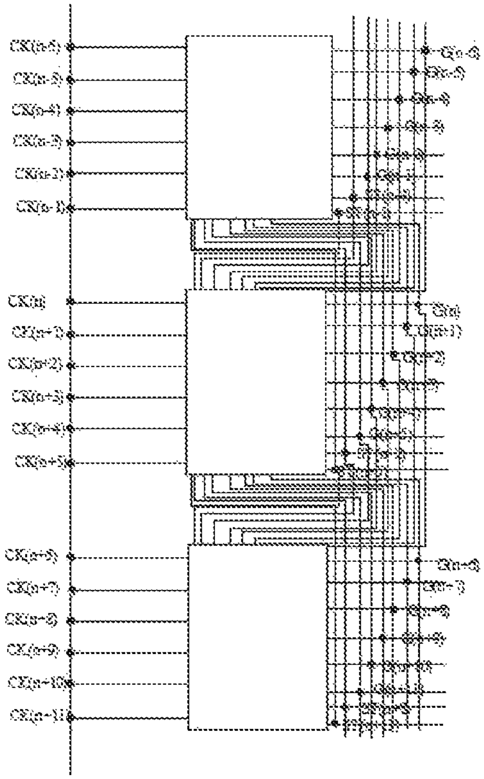
FIG. 1 is a structural schematic view of a GOA circuit according to an embodiment of the present disclosure.

The technical solutions in embodiments of the present disclosure will be clearly and completely described below in conjunction with the accompanying drawings in the embodiments of the present disclosure. It will be apparent that the described embodiments are only some of but not all of the embodiments of the present disclosure. Based on the embodiments of the present disclosure, all other embodiments obtained by a person skilled in the art without creative efforts fall within the scope of the present disclosure.

Embodiments of the present disclosure provide a GOA circuit and a display panel. The GOA circuit has a simple structure and can reduce a space occupied by a circuit layout while ensuring the circuit function. Thus an aperture ratio of the display panel is increased, and requirements for a narrow frame and a high resolution for the display panel is met. Each of them will be described in detail below. It should be noted that the description order of the following embodiments is not a limitation on the preferred order of the embodiments. In addition, in the description of the present disclosure, the term “including/comprising” means “including/comprising but not limited to". The terms "first", "second", "third", etc. are used only as labels to distinguish different objects, not to describe a particular order.

The transistors in all embodiments of the present disclosure may be thin film transistors or field effect transistors or other devices having the same characteristics. Since a source and a drain of a transistor used herein are symmetrical, the source and drain of the transistor are interchangeable. In the embodiments of the present disclosure, in order to distinguish two electrodes of the transistor other than a gate, one of the source and the drain is referred to as a first electrode, and the other of the source and the drain is referred to as a second electrode. According to the form shown in the drawings, a middle terminal of a switching transistor is the gate, a signal input terminal is the first electrode, and an output terminal is the second electrode. Transistors in an embodiment of the present disclosure is N-type transistors or P-type transistors, wherein the N-type transistor is turned on when the gate is at a high potential and turned off when the gate is at a low potential. The P-type transistor is turned on when the gate is at a low potential, and turned off when the gate is at a high potential.

Please refer to FIG. 1, and FIG. 1 is a structural schematic view of a GOA circuit according to an embodiment of the present disclosure. As shown in FIG. 1, the GOA circuit according to an embodiment of the present disclosure includes multi-stage cascaded GOA units. FIG. 1 illustrates cascaded (N−1)-th GOA unit, N-th GOA unit, and (N+1)-th GOA unit.

When the N-th GOA unit is in operate, a scanning signal output by the N-th GOA unit is at a high potential for turning on a transistor switch of each pixel in a row in the display panel. A pixel electrode in each pixel is charged by a data signal. The N-th stage transfer signal is used to control the operation of the (N+1)-th GOA unit. When the (N+1)-th GOA unit is in operate, a scanning signal output by the (N+1)-th GOA unit is at a high potential, and the scanning signal output by the N-th GOA unit is at a low potential.

Figure 2:
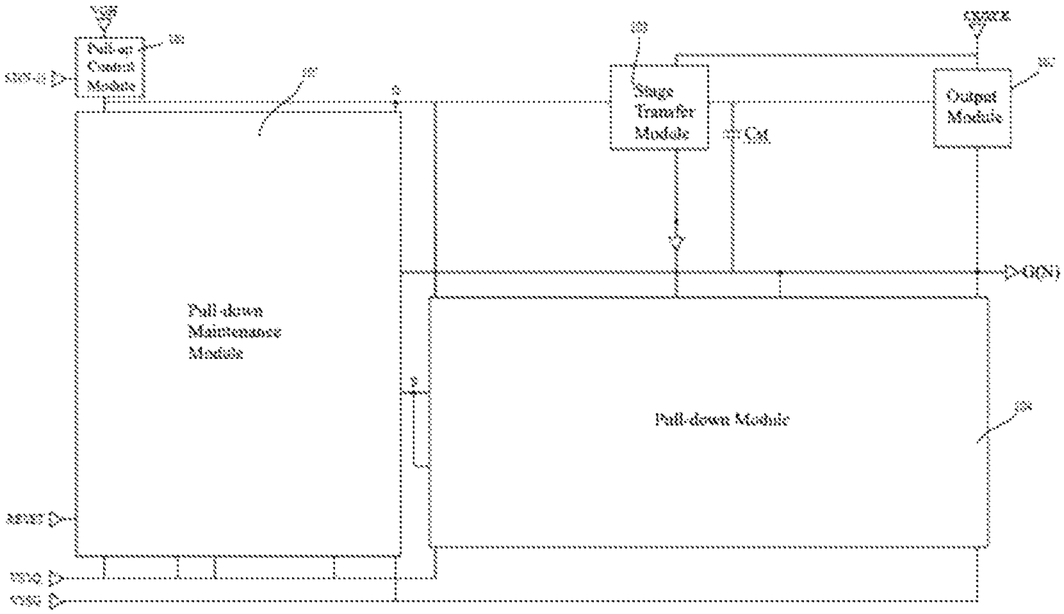
FIG. 2 is a structural schematic view of a first embodiment of a GOA unit in a GOA circuit according to an embodiment of the present disclosure.

Please refer to FIG. 2, and FIG. 2 is a structural schematic view of a first embodiment of a GOA unit in a GOA circuit according to an embodiment of the present disclosure. As shown in FIG. 2, the GOA unit includes a pull-up control module 101, an output module 102, a stage transfer module 103, a pull-down module 104, and a pull-down maintenance module 105.

The pull-up control module 101 is input with a previous-stage stage transfer signal ST(N−1) and a reference high level signal VGH, and is electrically connected to a first node Q. Under the control of the previous-stage stage transfer signal ST(N−1), the pull-up control module 101 is configured to pull up a potential of the first node Q to a potential of the reference high level signal.

The output module 102 is input with a first clock signal CK, and electrically connected to the first node Q and a current-stage scanning signal G(N). The output module 102 is configured to output the current-stage scanning signal G(N) under the control of the potential of the first node Q.

The stage transfer module 103 is input with the first clock signal CK, and electrically connected to the first node Q and a current-stage stage transfer signal ST(N). The stage transfer module 103 is configured to output the current-stage stage transfer signal ST(N) under the control of the potential of the first node Q.

The pull-down module 104 is input with a next stage scanning signal G(N+1), the current-stage stage transfer signal ST(N), the current-stage scanning signal G(N), a first reference low level signal VSSQ, and a second reference low level signal VSSG, and is electrically connected to the first node Q and a second node P. The pull-down module 104 is configured to pull down the potential of the first node Q, a potential of the second node P, and a potential of the current-stage stage transfer signal ST(N) to the potential of the first reference low level signal VSSQ, and pull down a potential of the current-stage scanning signal G(N) to a potential of the second reference low level signal VSSG, under the control of the next stage scanning signal G(N+1).

The pull-down maintenance module 105 is input with a reset signal RESET, a second clock signal CKN+1, the current-stage scanning signal G(N), the first reference low level signal VSSQ, and the second reference low level signal VSSG, and is electrically connected to the first node Q and the second node P. Under the control of the reset signal RESET and the second clock signal CKN+1, the pull-down maintenance module 105 is configured to maintain the potentials of the first node Q and the second node P at the potential of the first reference low level signal VSSQ, and maintain the potential of the current-stage scanning signal G(N) at the potential of the second reference low level signal VSSG.

The GOA unit further includes a bootstrap capacitor Cst, and two terminals of the bootstrap capacitor Cst are electrically connected to the first node Q and the current-stage scanning signal G(N), respectively. The bootstrap capacitor Cst is configured to pull up the potential of the first node Q again to ensure normal output of the current-stage scanning signal G(N).

The GOA circuit in the present disclosure has a simple structure and can reduce the space occupied by the circuit layout while ensuring the circuit function. Thus an aperture ratio of the display panel is increased, and requirements for a narrow frame and a high resolution for the display panel are met.

In addition, since the GOA circuit according to the present disclosure is disposed within the display area, and the number of signals is simplified, crosstalk between signals can be reduced, and devices with high mobility can be matched, and the number and the size of devices are small. Therefore, the space designed for the GOA circuit is greatly reduced, and the size of key devices, for example, the output module 102, can be increased, thereby ensuring the thrust of the large-size high-definition narrow-frame liquid crystal display panel.

Figure 3:
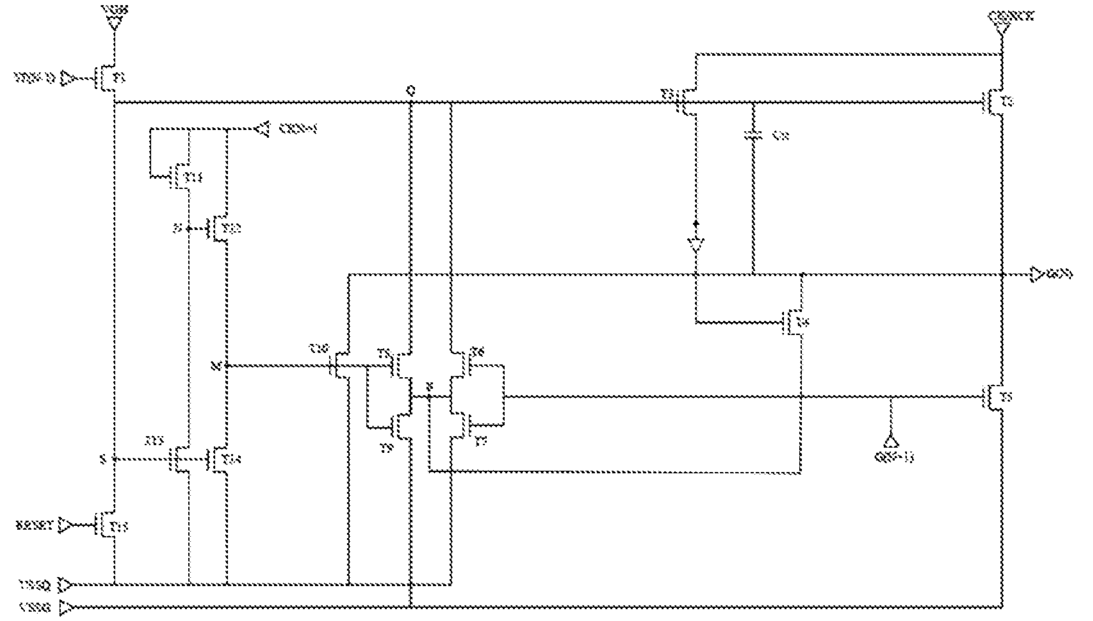
FIG. 3 is a circuit schematic view of a first embodiment of a GOA unit in a GOA circuit according to an embodiment of the present disclosure.

Please refer to FIG. 3, and FIG. 3 is a circuit schematic view of a first embodiment of a GOA unit in a GOA circuit according to an embodiment of the present disclosure. As shown in FIG. 3, the pull-up control module 101 includes a first transistor T1. A gate of the first transistor T1 is input with the previous-stage stage transfer signal ST(N−1), a first electrode of the first transistor T1 is input with the reference high level signal VGH, and a second electrode of the first transistor T1 is electrically connected to the first node Q.

The output module 102 includes a second transistor T2. A gate of the second transistor T2 is electrically connected to the first node Q. A first electrode of the second transistor T2 is input with the first clock signal CK. A second electrode of the second transistor T2 is electrically connected to the current-stage scanning signal G(N).

The stage transfer module 103 includes a third transistor T3. A gate of the third transistor T3 is electrically connected to the first node Q. A first electrode of the third transistor T3 is input with the first clock signal CK. A second electrode of the third transistor T3 is electrically connected to the current-stage stage transfer signal ST(N).

The pull-down module 104 includes a fourth transistor T4, a fifth transistor T5, a sixth transistor T6, and a seventh transistor T7. A gate of the fourth transistor T4 is input with the current-stage stage transfer signal ST(N). A first electrode of the fourth transistor T4 is electrically connected to the current-stage scanning signal G(N). A second electrode of the fourth transistor T4 is electrically connected to the second node P. A gate of the fifth transistor T5 is input with the next stage scanning signal G(N+1). A first electrode of the fifth transistor T5 is electrically connected to the current-stage scanning signal G(N). A second electrode of the fifth transistor T5 is input with the second reference low level signal VSSG. Agate of the sixth transistor T6 is input with the next stage scanning signal G(N+1). A first electrode of the sixth transistor T6 is electrically connected to the first node Q. A second electrode of the sixth transistor T6 is electrically connected to the second node P. A gate of the seventh transistor T7 is input with the next stage scanning signal G(N+1). A first electrode of the seventh transistor T7 is electrically connected to the second node P. A second electrode of the seventh transistor T7 is input with the first reference low level signal VSSQ.

The pull-down maintenance module 105 includes an eighth transistor T8, a ninth transistor T9, a tenth transistor T10, an eleventh transistor T11, a twelfth transistor T12, a thirteenth transistor T13, a fourteenth transistor T14, and a fifteenth transistor T15. A gate of the eighth transistor T8 is electrically connected to a third node M. A first electrode of the eighth transistor T8 is electrically connected to the first node Q. A second electrode of the eighth transistor T8 is electrically connected to the second node P. A gate of the ninth transistor T9 is electrically connected to the third node M. A first electrode of the ninth transistor T9 is electrically connected to the second node P. A second electrode of the ninth transistor T9 is input with the first reference low level signal VSSQ. A gate of the tenth transistor T10 is electrically connected to the third node M. A first electrode of the tenth transistor T10 is electrically connected to the current-stage scanning signal G(N). A second electrode of the tenth transistor T10 is input with the second reference low level signal VSSG. Both a gate of the eleventh transistor T11 and a first electrode of the eleventh transistor T11 are input with the second clock signal CKN+1. A second electrode of the eleventh transistor T11 is electrically connected to a fourth node N. A gate of the twelfth transistor T12 is electrically connected to the fourth node N. A first electrode of the twelfth transistor T12 is input with the second clock signal CKN+1. A second electrode of the twelfth transistor T12 is electrically connected to the third node M. A gate of the thirteenth transistor T13 is electrically connected to a fifth node S. A first electrode of the thirteenth transistor T13 is electrically connected to the fourth node N. A second electrode of the thirteenth transistor T13 is input with the first reference low level signal VSSQ. A gate of the fourteenth transistor T14 is electrically connected to the fifth node S. A first electrode of the fourteenth transistor T14 is electrically connected to the third node M. A second electrode of the fourteenth transistor T14 is input with the first reference low level signal VSSQ. A gate of the fifteenth transistor T15 is input with the reset signal RESET. A first electrode of the fifteenth transistor T15 is electrically connected to the fifth node S. A second electrode of the fifteenth transistor T15 is input with the first reference low level signal VSSQ.

The first transistor T1, the second transistor T2, the third transistor T3, the fourth transistor T4, the fifth transistor T5, the sixth transistor T6, the seventh transistor T7, the eighth transistor T8, the ninth transistor T9, the tenth transistor T10, the eleventh transistor T11, the twelfth transistor T12, the thirteenth transistor T13, the fourteenth transistor T14, and the fifteenth transistor T15 are transistors of the same type.

The potential of the first clock signal CK is opposite to the potential of the second clock signal CKN+1.

Specifically, when in operation, the start signal STV is input into the pull-up control module 101 of a first GOA unit and the pull-down module 104 of a last GOA unit.

Figure 4:
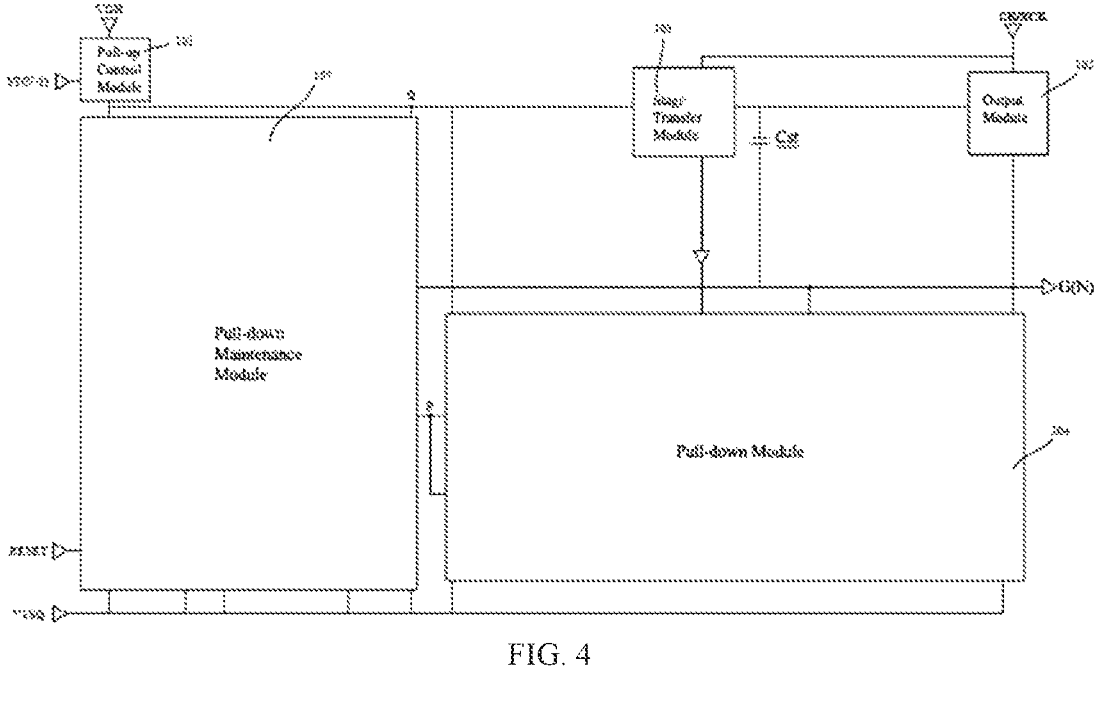
FIG. 4 is a structural schematic view of a second embodiment of a GOA unit in a GOA circuit according to an embodiment of the present disclosure.

Specifically, please refer to FIG. 4, and FIG. 4 is a structural schematic view of a second embodiment of a GOA unit in a GOA circuit according to an embodiment of the present disclosure. As shown in FIG. 4, both the pull-down module 104 and the pull-down maintenance module 105 are input with the first reference low level signal VSSQ.

Specifically, the pull-down module 104 is input with the next stage scanning signal G(N+1), the current-stage stage transfer signal ST(N), the current-stage scanning signal G(N), and the first reference low level signal VSSQ, and is electrically connected to the first node Q and a second node P. The pull-down module 104 is configured to pull down the potentials of the first node Q, the second node P, and the current-stage stage transfer signal ST(N), and the current-stage scanning signal G(N) to the potential of the second reference low level signal VSSG, under the control of the next stage scanning signal G(N+1).

The pull-down maintenance module 105 is input with the reset signal RESET, the second clock signal CKN+1, the current-stage scanning signal G(N), and the first reference low level signal VSSQ, and is electrically connected to the first node Q and the second node P. Under the control of the reset signal RESET and the second clock signal CKN+1, the pull-down maintenance module 105 is configured to maintain the potentials of the first node Q, the second node P, and the current-stage scanning signal G(N) at the potential of the first reference low level signal VSSQ.

The pull-up control module 101 is input with the previous-stage stage transfer signal ST(N−1) and the reference high level signal VGH, and is electrically connected to a first node Q. Under the control of the previous-stage stage transfer signal ST(N−1), the pull-up control module 101 is configured to pull up the potential of the first node Q to the reference high level potential.

The output module 102 is input with a first clock signal CK, and electrically connected to the first node Q and the current-stage scanning signal G(N). The output module 102 is configured to output the current-stage scanning signal G(N) under the control of the potential of the first node Q.

The stage transfer module 103 is input with the first clock signal CK, and electrically connected to the first node Q and the current-stage stage transfer signal ST(N). The stage transfer module 103 is configured to output the current-stage stage transfer signal ST(N) under the control of the potential of the first node Q.

The GOA unit further includes a bootstrap capacitor Cst, and two terminals of the bootstrap capacitor Cst are electrically connected to the first node Q and the current-stage scanning signal G(N), respectively. The bootstrap capacitor Cst is configured to pull up the potential of the first node Q again to ensure normal output of the current-stage scanning signal G(N).

It should be noted that both the pull-down maintenance module 105 and the pull-down module 104 in this embodiment of the present disclosure both are electrically connected to the first reference low level signal VSSQ, so that the structure of the GOA circuit can be further simplified, the number of signals can be reduced, and crosstalk between signals can be further reduced. At the same time, the space designed for the GOA circuit is reduced. Therefore, the aperture ratio of the display panel is increased, and requirements for the narrow frame and the high resolution for the display panel are met.

Figure 5:
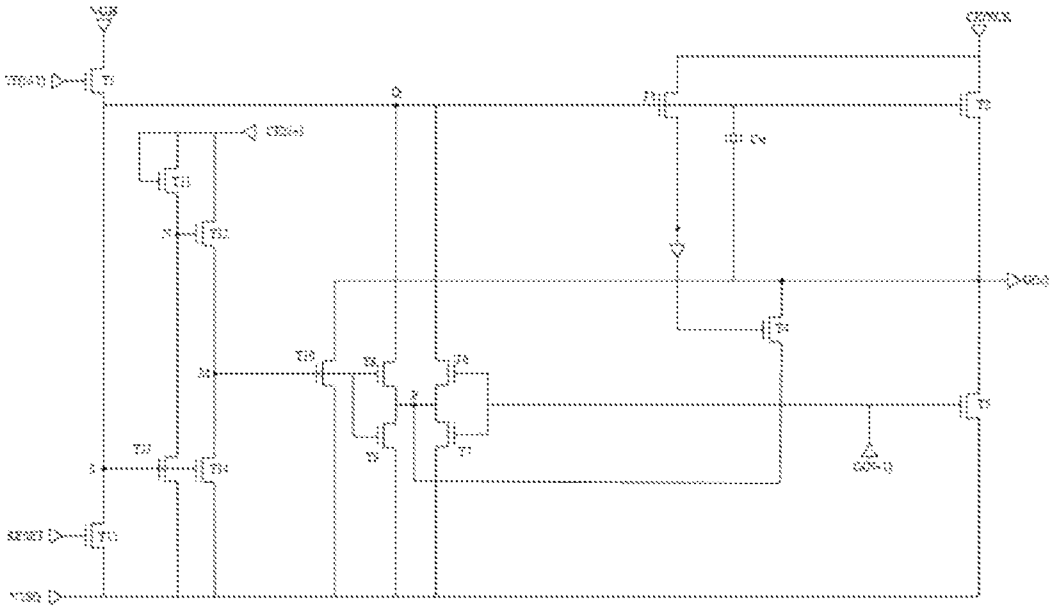
FIG. 5 is a circuit schematic view of a second embodiment of a GOA unit in a GOA circuit according to an embodiment of the present disclosure.

Specifically, please refer to FIG. 5, and FIG. 5 is a circuit schematic view of a second embodiment of a GOA unit in the GOA circuit according to an embodiment of the present disclosure. As shown in FIG. 5, The pull-down module 104 includes the fourth transistor T4, the fifth transistor T5, the sixth transistor T6, and the seventh transistor T7. The gate of the fourth transistor T4 is input with the current-stage stage transfer signal ST(N). The first electrode of the fourth transistor T4 is electrically connected to the current-stage scanning signal G(N). The second electrode of the fourth transistor T4 is electrically connected to the second node P. The gate of the fifth transistor T5 is input with the next stage scanning signal G(N+1). The first electrode of the fifth transistor T5 is electrically connected to the current-stage scanning signal G(N). The second electrode of the fifth transistor T5 is input with the first reference low level signal VSSQ. The gate of the sixth transistor T6 is connected to the next stage scanning signal G(N+1). The first electrode of the sixth transistor T6 is electrically connected to the first node Q. The second electrode of the sixth transistor T6 is electrically connected to the second node P. The gate of the seventh transistor T7 is input with the next stage scanning signal G(N+1). The first electrode of the seventh transistor T7 is electrically connected to the second node P. The second electrode of the seventh transistor T7 is input with the first reference low level signal VSSQ.

The pull-down maintenance module 105 includes the eighth transistor T8, the ninth transistor T9, the tenth transistor T10, the eleventh transistor T**1*l*, the twelfth transistor T12, the thirteenth transistor T13, the fourteenth transistor T14, and the fifteenth transistor T15. The gate of the eighth transistor T8 is electrically connected to the third node M. The first electrode of the eighth transistor T8 is electrically connected to the first node Q. The second electrode of the eighth transistor T8 is electrically connected to the second node P. The gate of the ninth transistor T9 is electrically connected to the third node M. The first electrode of the ninth transistor T9 is electrically connected to the second node P. The second electrode of the ninth transistor T9 is input with the first reference low level signal VSSQ. The gate of the tenth transistor T10 is electrically connected to the third node M. The first electrode of the tenth transistor T10 is electrically connected to the current-stage scanning signal G(N). The second electrode of the tenth transistor T10 is input with the first reference low level signal VSSQ. The gate of the eleventh transistor T11 and a first electrode of the eleventh transistor T11 both are input with the second clock signal CKN+1. The second electrode of the eleventh transistor T11 is electrically connected to the fourth node N. The gate of the twelfth transistor T12 is electrically connected to the fourth node N. The first electrode of the twelfth transistor T12 is input with the second clock signal CKN+1. The second electrode of the twelfth transistor T12 is electrically connected to the third node M. The gate of the thirteenth transistor T13 is electrically connected to a fifth node S. The first electrode of the thirteenth transistor T13 is electrically connected to the fourth node N. The second electrode of the thirteenth transistor T13 is input with the first reference low level signal VSSQ. The gate of the fourteenth transistor T14 is electrically connected to the fifth node S. The first electrode of the fourteenth transistor T14 is electrically connected to the third node M. The second electrode of the fourteenth transistor T14 is input with the first reference low level signal VSSQ. The gate of the fifteenth transistor T15 is input with the reset signal RESET. The first electrode of the fifteenth transistor T15 is electrically connected to the fifth node S. The second electrode of the fifteenth transistor T15** is input with the first reference low level signal VSSQ.

The pull-up control module 101 includes a first transistor T1. The gate of the first transistor T1 is input with the previous-stage stage transfer signal ST(N−1), the first electrode of the first transistor T1 is input with the reference high level signal VGH, and the second electrode of the first transistor T1 is electrically connected to the first node Q.

The output module 102 includes a second transistor T2. The gate of the second transistor T2 is electrically connected to the first node Q. The first electrode of the second transistor T2 is connected to the first clock signal CK. The second electrode of the second transistor T2 is electrically connected to the current-stage scanning signal G(N).

The stage transfer module 103 includes a third transistor T3. The gate of the third transistor T3 is electrically connected to the first node Q. The first electrode of the third transistor T3 is connected to the first clock signal CK, and the second electrode of the third transistor T3 is electrically connected to the current-stage stage transfer signal ST(N).

The potential of the first clock signal CK is opposite to the potential of the second clock signal CKN+1. Further, when in-operation, the start signal STV is input into the pull-up control module 101 of the first GOA unit and the pull-down module 104 of the last GOA unit.

Figure 6:
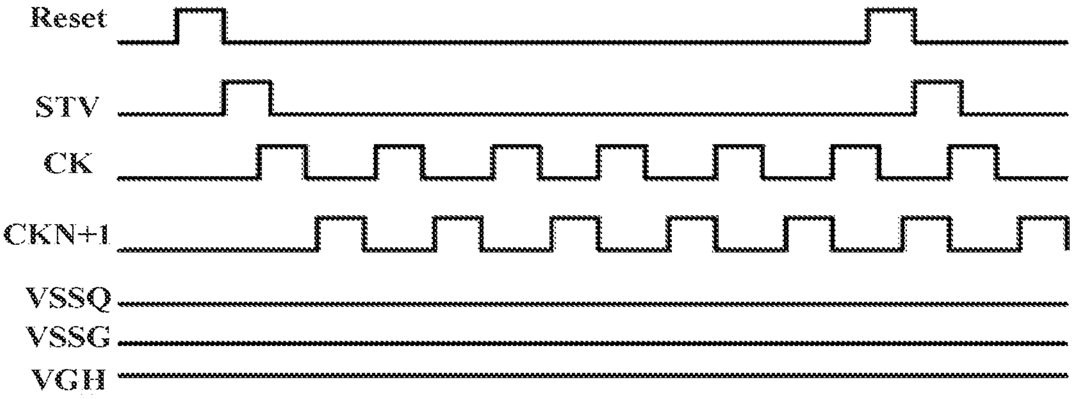
FIG. 6 is a signal timing diagram of a GOA unit in a GOA circuit according to an embodiment of the present disclosure.

Please refer to FIG. 6, and FIG. 6 is a signal timing diagram of a GOA unit in a GOA circuit according to an embodiment of the present disclosure. FIG. 6 illustrates a group of clock control signals in the GOA circuit within a frame period. The high frequency signal with a duty ratio of 50/50 is used. In the actual liquid crystal display, the clock signals with different duty ratios may be set as needed to drive the GOA circuit, or a plurality of groups of high frequency clock signals may be designed according to the load of the liquid crystal display panel. Specifically, the reset signal RESET is input to discharge the first node Q. The start signal STV is input into the pull-up control module 101 of the first GOA unit and the pull-down module 104 of the last GOA unit for charging the first node Q.

Specifically, the start signal STV of the GOA circuit is configured to start the first GOA circuit, and the start signal STV of the (N+1)-th GOA circuit is generated by the current-stage stage transfer signal ST(N) in the stage transfer module 103 of the N-th GOA circuit, so that the GOA driving circuit can be turned on stage by stage to realize row scanning drive.

The potential of the first clock signal CK is opposite to that of the second clock signal CKN+1. The second clock signal CKN+1 is configured to pull down the potentials of the first node Q and the current-stage scanning signal G(N). Specifically, the first clock signal CK and the second clock signal CKN+1 are a group of high-frequency clock signals having the same high and low potentials and opposite phases. The pulse width, cycle, and high and low potentials of the clock signal mainly depend on the design requirements for the scanning signal waveform of the liquid crystal display panel. Therefore, in the actual liquid crystal display application, it is not necessarily a signal having a duty ratio of 50/50 as shown in the figure(s), and sometimes different numbers of clock signals are used to bear loads required by different designs according to the requirements for the panel design.

Here, the first transistor T1 is configured to turn on the N-th GOA circuit under the control of the previous-stage stage transfer signal ST(N−1) of the previous GOA circuit and the output signal G of the previous output signal G(N−1) corresponding to the first electrode of the first transistor T1.

The waveform of the first node Q has two potential rises, mainly to ensure the normal output of the current level scanning signal G (N), and the first node Q is also configured to remove the influence of the pull-down maintenance module 105 on the first node Q and the current-stage scanning signal G(N) during the output of the Gate waveform. The potentials of the first reference low level signal VSSQ and the second reference low level signal VSSG during this period directly determines the output waveforms of the first node Q and the current-stage scanning signal G(N). The first reference low-level signal VSSQ and the second reference low-level signal VSSG are both DC negative voltage sources, and are mainly used to maintain a stable off state of the first node Q and the current-stage scanning signal G(N) during the non-output.

Figure 7:
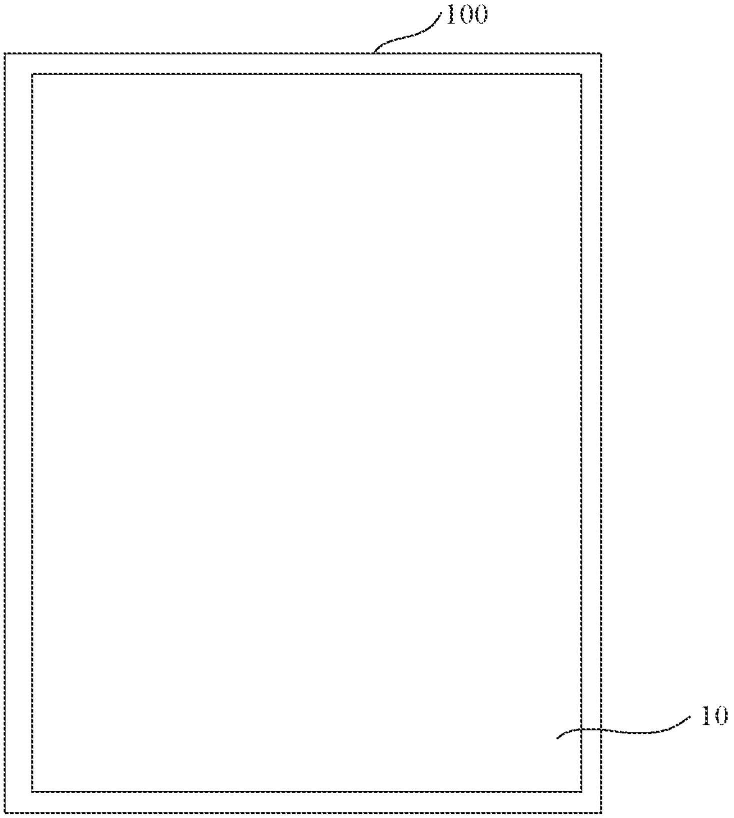
FIG. 7 is a structural schematic view of a display panel according to an embodiment of the present disclosure.

Please refer to FIG. 7, and FIG. 7 is a structural schematic view of a display panel according to an embodiment of the present disclosure. As shown in FIG. 7, the display panel includes a display area 100 and a GOA circuit 10 integrated on the display area 100. The structure and principle of the GOA circuit are similar to those described above, which will not be repeated herein.

A GOA circuit and a display panel according to the embodiments of the present disclosure are described in detail above. The principles and implementations of the present disclosure are described herein by specific examples. The description of the above embodiments is only used to help understand the method and core idea of the present disclosure. At the same time, for those skilled in the art, according to the idea of the present disclosure, there will be some changes in both specific implementations and application scope. In conclusion, the contents of the present specification shall not be construed as limiting the present disclosure.

What is claimed is:

1. A GOA circuit comprising multi-stage cascaded GOA units, wherein each of the GOA units comprises a pull-up control module, an output module, a stage transfer module, a pull-down module and a pull-down maintenance module;

the pull-up control module is input with a previous-stage stage transfer signal and a reference high level signal, and is electrically connected to a first node, and the pull-up control module is configured to pull up a potential of the first node to a potential of the reference high level signal under the control of the previous-stage stage transfer signal;

the output module is input with a first clock signal, and electrically connected to the first node and a current-stage scanning signal, and the output module is configured to output the current-stage scanning signal under the control of the potential of the first node;

the stage transfer module is input with the first clock signal and electrically connected to the first node and a current-stage stage transfer signal, and the stage transfer module is configured to output the current-stage stage transfer signal under the control of the potential of the first node;

the pull-down module is input with a next stage scanning signal, the current-stage stage transfer signal, the current-stage scanning signal, a first reference low level signal, and a second reference low level signal, and is electrically connected to the first node and a second node, and the pull-down module is configured to pull down the potential of the first node, a potential of the second node, and a potential of the current-stage stage transfer signal to a potential of the first reference low level signal, and pull down a potential of the current-stage scanning signal to a potential of the second reference low level signal under the control of the next stage scanning signal; and the pull-down maintenance module is input with a reset signal, a second clock signal, the current-stage scanning signal, the first reference low level signal, and the second reference low level signal, and is electrically connected to the first node and the second node, and the pull-down maintenance module is configured to maintain the potentials of the first node and the second node at the potential of the first reference low level signal, and maintain the potential of the current-stage scanning signal at the potential of the second reference low level signal under the control of the reset signal and the second clock signal.

2. The GOA circuit according to claim 1, wherein each of the GOA units further comprises a bootstrap capacitor, two terminals of the bootstrap capacitor are electrically connected to the first node and the current-stage scanning signal, respectively, and the bootstrap capacitor is configured to pull up the potential of the first node again to ensure normal output of the current-stage scanning signal.

3. The GOA circuit according to claim 2, wherein the pull-up control module comprises a first transistor, a gate of the first transistor is input with the previous-stage stage transfer signal, a first electrode of the first transistor is input with the reference high level signal, and a second electrode of the first transistor is electrically connected to the first node.

4. The GOA circuit according to claim 3, wherein the output module comprises a second transistor, a gate of the second transistor is electrically connected to the first node, a first electrode of the second transistor is input with the first clock signal, and a second electrode of the second transistor is electrically connected to the current-stage scanning signal.

5. The GOA circuit according to claim 4, wherein the stage transfer module comprises a third transistor, a gate of the third transistor is electrically connected to the first node, a first electrode of the third transistor is input with the first clock signal, and a second electrode of the third transistor is electrically connected to the current-stage stage transfer signal.

6. The GOA circuit according to claim 5, wherein the pull-down module comprises a fourth transistor, a fifth transistor, a sixth transistor, and a seventh transistor, and wherein a gate of the fourth transistor is input with the current-stage stage transfer signal, a first electrode of the fourth transistor is electrically connected to the current-stage scanning signal, and a second electrode of the fourth transistor is electrically connected to the second node;

a gate of the fifth transistor is input with the next stage scanning signal, a first electrode of the fifth transistor is electrically connected to the current-stage scanning signal, and a second electrode of the fifth transistor is input with the second reference low level signal;

a gate of the sixth transistor is input with the next stage scanning signal, a first electrode of the sixth transistor is electrically connected to the first node, and a second electrode of the sixth transistor is electrically connected to the second node; and a gate of the seventh transistor is input with the next stage scanning signal, a first electrode of the seventh transistor is electrically connected to the second node, and a second electrode of the seventh transistor is input with the first reference low level signal.

7. The GOA circuit according to claim 6, wherein the pull-down maintenance module comprises an eighth transistor, a ninth transistor, a tenth transistor, an eleventh transistor, a twelfth transistor, a thirteenth transistor, a fourteenth transistor, and a fifteenth transistor, and wherein a gate of the eighth transistor is electrically connected to a third node, a first electrode of the eighth transistor is electrically connected to the first node, and a second electrode of the eighth transistor is electrically connected to the second node;

a gate of the ninth transistor is electrically connected to the third node, a first electrode of the ninth transistor is electrically connected to the second node, and a second electrode of the ninth transistor is input with the first reference low level signal;

a gate of the tenth transistor is electrically connected to the third node, a first electrode of the tenth transistor is electrically connected to the current-stage scanning signal, and a second electrode of the tenth transistor is input with the second reference low level signal;

both a gate of the eleventh transistor and a first electrode of the eleventh transistor are input with the second clock signal, and the second electrode of the eleventh transistor is electrically connected to a fourth node;

a gate of the twelfth transistor is electrically connected to the fourth node, a first electrode of the twelfth transistor is input with the second clock signal, and a second electrode of the twelfth transistor is electrically connected to the third node;

a gate of the thirteenth transistor is electrically connected to a fifth node, a first electrode of the thirteenth transistor is electrically connected to the fourth node, and a second electrode of the thirteenth transistor is input with the first reference low level signal;

a gate of the fourteenth transistor is electrically connected to the fifth node, a first electrode of the fourteenth transistor is electrically connected to the third node, and a second electrode of the fourteenth transistor is input with the first reference low level signal; and a gate of the fifteenth transistor is input with the reset signal, a first electrode of the fifteenth transistor is electrically connected to the fifth node, and a second electrode of the fifteenth transistor is input with the first reference low level signal.

8. The GOA circuit according to claim 7, wherein the first transistor, the second transistor, the third transistor, the fourth transistor, the fifth transistor, the sixth transistor, the seventh transistor, the eighth transistor, the ninth transistor, the tenth transistor, the eleventh transistor, the twelfth transistor, the thirteenth transistor, the fourteenth transistor, and the fifteenth transistor are transistors of the same type.

9. The GOA circuit according to claim 1, wherein a potential of the first clock signal is opposite to a potential of the second clock signal.

10. The GOA circuit according to claim 1, wherein in operation, a start signal is input into the pull-up control module of a first GOA unit and the pull-down module of a last GOA unit.

11. A display panel comprising a display area and a GOA circuit integrated on the display area, wherein the GOA circuit comprises multi-stage cascaded GOA units, and wherein each of the GOA units comprises a pull-up control module, an output module, a stage transfer module, a pull-down module and a pull-down maintenance module;

the pull-up control module is input with a previous-stage stage transfer signal and a reference high level signal, and is electrically connected to a first node, and the pull-up control module is configured to pull up a potential of the first node to a potential of the reference high level signal under the control of the previous-stage stage transfer signal;

the output module is input with a first clock signal, and electrically connected to the first node and a current-stage scanning signal, and the output module is configured to output the current-stage scanning signal under the control of the potential of the first node;

the stage transfer module is input with the first clock signal, and electrically connected to the first node and a current-stage stage transfer signal, and the stage transfer module is configured to output the current-stage stage transfer signal under the control of the potential of the first node;

the pull-down module is input with a next stage scanning signal, the current-stage stage transfer signal, the current-stage scanning signal, a first reference low level signal, and a second reference low level signal, and is electrically connected to the first node and a second node, and the pull-down module is configured to pull down the potential of the first node, a potential of the second node, and a potential of the current-stage stage transfer signal to a potential of the first reference low level signal, and pull down a potential of the current-stage scanning signal to a potential of the second reference low level signal, under the control of the next stage scanning signal; and the pull-down maintenance module is input with a reset signal, a second clock signal, the current-stage scanning signal, the first reference low level signal, and the second reference low level signal, and is electrically connected to the first node and the second node, and the pull-down maintenance module is configured to maintain the potentials of the first node and the second node at the potential of the first reference low level signal, and maintain the potential of the current-stage scanning signal at the potential of the second reference low level signal under the control of the reset signal and the second clock signal.

12. The display panel according to claim 11, wherein each of the GOA units further comprises a bootstrap capacitor, two terminals of the bootstrap capacitor are electrically connected to the first node and the current-stage scanning signal, respectively, and the bootstrap capacitor is configured to pull up the potential of the first node again to ensure normal output of the current-stage scanning signal.

13. The display panel according to claim 12, wherein the pull-up control module comprises a first transistor, a gate of the first transistor is input with the previous-stage stage transfer signal, a first electrode of the first transistor is input with the reference high level signal, and a second electrode of the first transistor is electrically connected to the first node.

14. The display panel according to claim 13, wherein the output module comprises a second transistor, a gate of the second transistor is electrically connected to the first node, a first electrode of the second transistor is input with the first clock signal, and a second electrode of the second transistor is electrically connected to the current-stage scanning signal.

15. The display panel according to claim 14, wherein the stage transfer module comprises a third transistor, a gate of the third transistor is electrically connected to the first node, a first electrode of the third transistor is input with the first clock signal, and a second electrode of the third transistor is electrically connected to the current-stage stage transfer signal.

16. The display panel according to claim 15, wherein the pull-down module comprises a fourth transistor, a fifth transistor, a sixth transistor, and a seventh transistor, and wherein a gate of the fourth transistor is input with the current-stage stage transfer signal, a first electrode of the fourth transistor is electrically connected to the current-stage scanning signal, and a second electrode of the fourth transistor is electrically connected to the second node;

a gate of the fifth transistor is input with the next stage scanning signal, a first electrode of the fifth transistor is electrically connected to the current-stage scanning signal, and a second electrode of the fifth transistor is input with the second reference low level signal;

a gate of the sixth transistor is input with the next stage scanning signal, a first electrode of the sixth transistor is electrically connected to the first node, and a second electrode of the sixth transistor is electrically connected to the second node; and a gate of the seventh transistor is input with the next stage scanning signal, a first electrode of the seventh transistor is electrically connected to the second node, and a second electrode of the seventh transistor is input with the first reference low level signal.

17. The display panel according to claim 16, wherein the pull-down maintenance module comprises an eighth transistor, a ninth transistor, a tenth transistor, an eleventh transistor, a twelfth transistor, a thirteenth transistor, a fourteenth transistor, and a fifteenth transistor, and wherein a gate of the eighth transistor is electrically connected to a third node, a first electrode of the eighth transistor is electrically connected to the first node, and a second electrode of the eighth transistor is electrically connected to the second node;

a gate of the ninth transistor is electrically connected to the third node, a first electrode of the ninth transistor is electrically connected to the second node, and a second electrode of the ninth transistor is input with the first reference low level signal;

a gate of the tenth transistor is electrically connected to the third node, a first electrode of the tenth transistor is electrically connected to the current-stage scanning signal, and a second electrode of the tenth transistor is input with the second reference low level signal;

both a gate of the eleventh transistor and a first electrode of the eleventh transistor are input with the second clock signal, and the second electrode of the eleventh transistor is electrically connected to a fourth node;

a gate of the twelfth transistor is electrically connected to the fourth node, a first electrode of the twelfth transistor is input with the second clock signal, and a second electrode of the twelfth transistor is electrically connected to the third node;

a gate of the thirteenth transistor is electrically connected to a fifth node, a first electrode of the thirteenth transistor is electrically connected to the fourth node, and a second electrode of the thirteenth transistor is input with the first reference low level signal;

a gate of the fourteenth transistor is electrically connected to the fifth node, a first electrode of the fourteenth transistor is electrically connected to the third node, and a second electrode of the fourteenth transistor is input with the first reference low level signal; and a gate of the fifteenth transistor is input with the reset signal, a first electrode of the fifteenth transistor is electrically connected to the fifth node, and a second electrode of the fifteenth transistor is input with the first reference low level signal.

18. The display panel according to claim 17, wherein the first transistor, the second transistor, the third transistor, the fourth transistor, the fifth transistor, the sixth transistor, the seventh transistor, the eighth transistor, the ninth transistor, the tenth transistor, the eleventh transistor, the twelfth transistor, the thirteenth transistor, the fourteenth transistor, and the fifteenth transistor are transistors of the same type.

19. The display panel according to claim 11, wherein a potential of the first clock signal is opposite to a potential of the second clock signal.

20. The display panel according to claim 11, wherein in operation, a start signal is input into the pull-up control module of a first GOA unit and the pull-down module of a last GOA unit.

* * * * *